Nov. 1, 1932. F. B. NIMICK 1,885,132
METHOD OF SHAPING COMPOSITE RODS
Filed Oct. 1, 1931 2 Sheets-Sheet 1

INVENTOR
Francis B. Nimick,
By Archworth Martin,
Attorney.

Nov. 1, 1932.  F. B. NIMICK  1,885,132
METHOD OF SHAPING COMPOSITE RODS
Filed Oct. 1, 1931   2 Sheets-Sheet 2
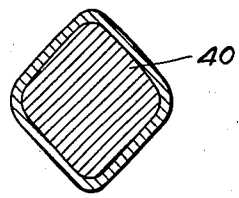
Fig.15.
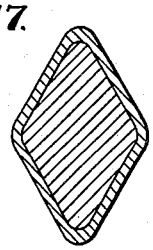
Fig.17.
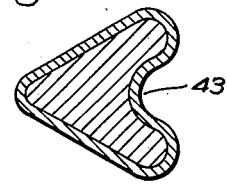
Fig.19.
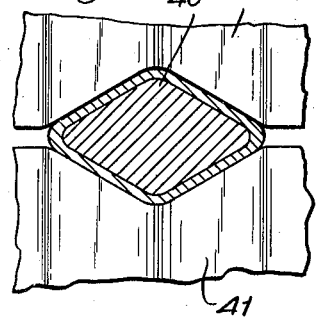
Fig.16.
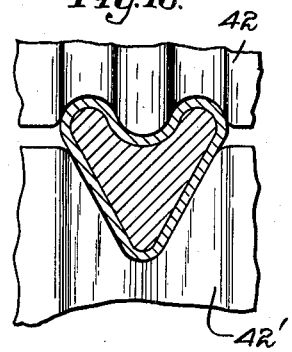
Fig.18.
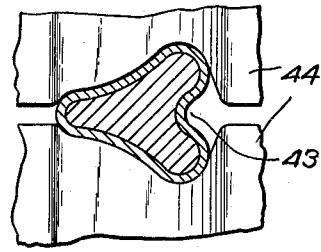
Fig.20.
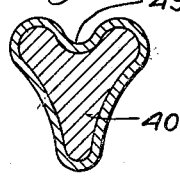
Fig.21.
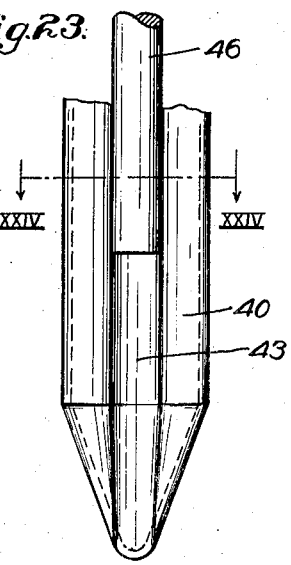
Fig.23.
Fig.22.
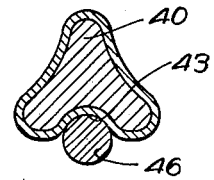
Fig.24.
INVENTOR
Francis B. Nimick,
By Archworth Martin,
Attorney.

Patented Nov. 1, 1932

1,885,132

UNITED STATES PATENT OFFICE

FRANCIS B. NIMICK, OF CORAOPOLIS, PENNSYLVANIA, ASSIGNOR TO COLONIAL STEEL COMPANY, OF PITTSBURGH, PENNSYLVANIA, A CORPORATION OF PENNSYLVANIA

METHOD OF SHAPING COMPOSITE RODS

Application filed October 1, 1931. Serial No. 566,221.

My invention relates to the shaping of composite metal bodies such as those composed of a metal core and a sheath of metal softer than the core, and is hereinafter described as employed more particularly in the making of electric conductors such as ground rods, which are composed of a steel core having a copper sheath.

In the rolling and forging of metal sheathed bars, difficulty is experienced in effecting uniform distribution of the metal of a soft metal sheath such as copper, upon a core bar such as steel. In the case of ground rods, the steel core provides the required strength, and the copper sheath is employed because of its relatively great conductivity, and should be evenly distributed on the surface of the core bar.

My invention is particularly directed to the making of composite bars that are non-circular in cross section, and hence presenting greater problems in the distribution of the copper during rolling or forging of the bars. Non-circular bars are preferable to those which are circular, because for a given cross-sectional area, they will have a greater surface area in proportion to cross sectional area, and have a more extended contact with the ground, and furthermore will have greater strength and will not be so readily broken or deformed when being driven into hard soil.

As above-indicated, my invention has for its object the provision of a method whereby a coating of copper or other relatively soft material can be evenly distributed or maintained upon a core bar during rolling and forging thereof, and has the further advantage that a close union is effected between the sheath and the core.

Figure 1:
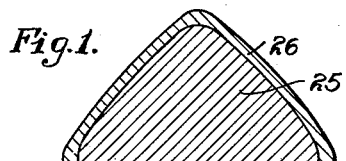
Figure 3:
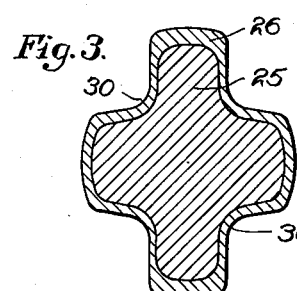
Figure 5:
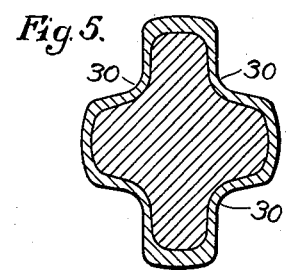
Figure 2:
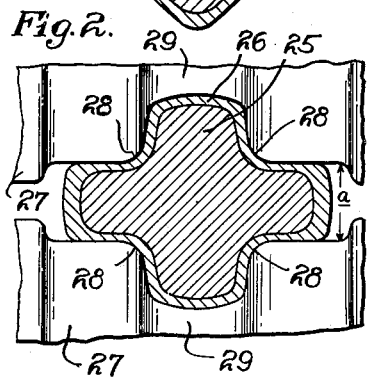
Figure 4:
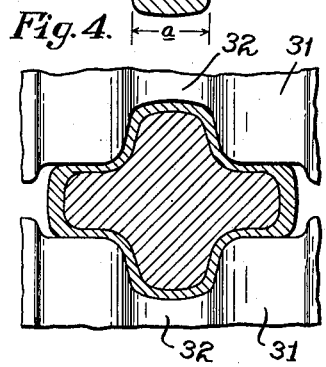
Figure 6:
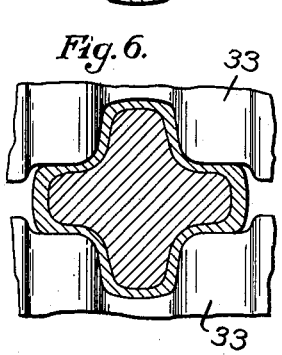
Figure 7:
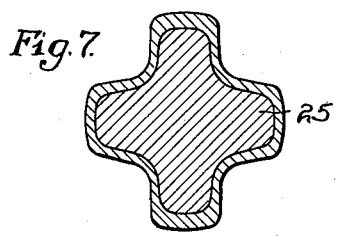
Figure 9:
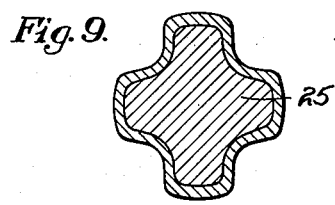
Figure 12:
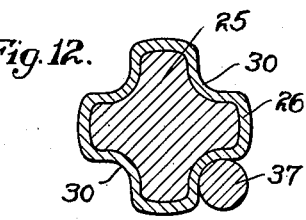
Figure 8:
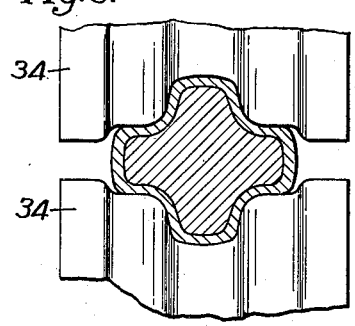
Figure 10:
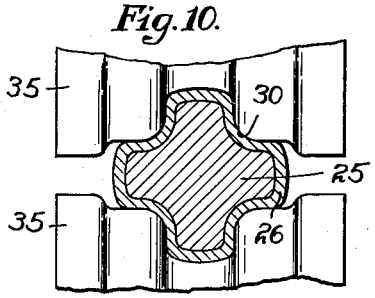
Figure 13:
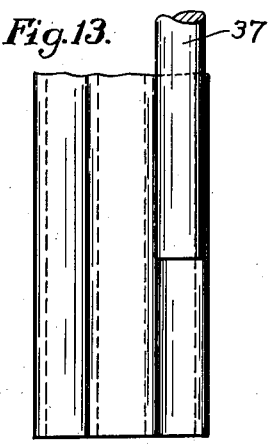
Figure 11:
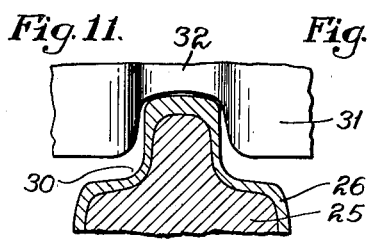
Figure 14:
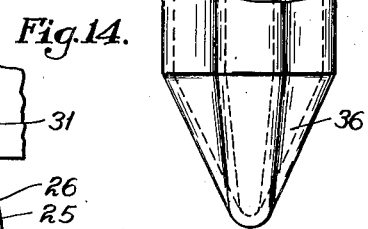

Some of the ways in which my invention may be practised are shown in the accompanying drawings, wherein Figure 1 is a cross-sectional view of a composite ingot ready for rolling; Fig. 2 shows the manner in which the cross-sectional form of said ingot is altered during the first reducing pass between rolls; Fig. 3 shows the position to which said ingot is turned, preparatory to the second pass through reducing rolls; Fig. 4 shows the shape to which the ingot is formed during the second pass; Fig. 5 shows the position to which the ingot is turned for the third pass; Fig. 6 shows the third pass; Figs. 7 to 10 show succeeding steps in the rolling of the ingot; Fig. 11 shows the relation of the sides of the ingot to the walls of the rolls at the beginning of each pass after the ingot has been turned; Fig. 12 is a cross-sectional view of the completed bar; Fig. 13 is a fragmentary side elevational view thereof; Fig. 14 is a fragmentary view showing the pointed end of a ground rod formed from the bar of Fig. 13; Figs. 15 to 22 show successive steps in the rolling of a composite ingot of different form than that shown in Figs. 1 to 10; Fig. 23 is a modification of the structure of Fig. 13, and Fig. 24 is a view taken on the line XXIV—XXIV of Fig. 23.

Referring first to Figs. 1 to 11, the composite bar is shown as composed of a steel core 25 having a copper sheath 26. The copper sheath may be applied in any suitable manner as by electro-plating the bar with copper, by placing a copper sleeve on the bar 25, etc. The composite ingot of Fig. 1 can be of any suitable thickness and length, depending upon the length desired for the completed conductor and on the desired amount of reduction in thickness of the bar during the rolling or forging operation.

The ingot when heated to forging temperature is passed between reducing rolls 27 in somewhat the manner of ordinary rolling mill practice, but the radius of curvature of the shoulders 28 of the rolls that connect the horizontal working surfaces of the rolls with the annular grooves 29 thereof is such as to give to the ingot at these points radii of curvature substantially the same as the radii of the curved portions 30 in the completed bar. This is an important feature of my invention.

If the curvature of the ingot at these points was gradually changed during successive passes, the copper would be gradually displaced from such points and made excessively thin, the displaced copper being crowded to other portions of the bar.

The vertically-extending ribs which are produced through the forming of the curved depressions 30 produce a ribbed effect, the ribs at the top and bottom sides of the bar being shallower in vertical direction, but wider in horizontal direction, than the ribs which are produced at the sides of the bar. After the first pass, the bar is turned 90° about its longitudinal axis, to the position shown in Fig. 3, and is passed through a second pair of reducing rolls 31 that are shaped similarly to the rolls 27 but which are located closer together and whose grooves 32 are of reduced dimension relative to the grooves 29. The width of the grooves 32 at their bottoms is greater than the dimension $a$ of the billet so that, as shown in Fig. 11, some clearance space is provided between the radial walls of the grooves and the adjacent surfaces of the billet to permit copper to be forced toward the corners 30 by pressure from the bottom walls of the grooves.

The second pass reduces the ingot to the dimension shown in Figs. 4 and 5, without however changing the radius of curvature at the points 30. The bar as it comes from the rolls 31 is again turned 90°, to the position shown in Fig. 5, and is passed through a third pair of reducing rolls 33.

The bar, after it leaves the rolls 33, is passed between a pair of rolls 34 which imparts to the bar approximately its completed form; the bar however being given still another pass through rolls 35 in order to effect a still more even distribution of the copper sheath 26, and being turned 90° after each pass. The grooves of the rolls 33, 34 and 35 are also formed to provide clearance space between the radial walls of the grooves and the adjacent surfaces of the billet, as in the case of the grooves 32. The rolling of the bar in this manner also has the effect of making closer union between the copper and its core, so that no spaces are left between these two portions of the bar, that might result in deterioration of the bar through electrolytic action, corrosion, etc.

After the bar is completed, the end thereof may be shaped through forging action to form a point 36 at the lower end thereof, so that it can be driven into the ground in case it is to be employed as a ground rod. In the pointing of the bar, the copper sheath will be drawn down to completely enclose the lower end of the core. Also, a conductor bar 37 may be welded or otherwise secured to the bar in one of the grooves 30. The grooving of the bar not only provides the increased area of contacting surface and greater strength above-referred to, but provides for greater area of contact with the conductor 37, instead of mere line contact therewith as would be the case if the bar were circular or rectangular in cross section.

Referring now to Figs. 15 to 24, I show a composite ingot 40 that is similar to the ingot of Fig. 1. This ingot is passed between reducing rolls 41 and rolled to approximately diamond form as shown in Figs. 16 and 17. The ingot, when it has passed from between the rolls 41, is turned about its longitudinal axis for 90°, to bring it to the position shown in Fig. 17, and it is then passed between the rolls 42 and 42′, that make it of generally triangular form in cross section, but having a groove 43.

The ingot turned 90° from the position shown in Fig. 18 is then passed through reducing rolls 44, and thereafter when again turned 90° is passed through reducing rolls 45 and 45′. The groove 43, which, of course, extends longitudinally of the bar, may have a curvature of nearly 180°, so that a conductor 46 placed therein will have electrical contact therewith throughout nearly one-half the circumference of the conductor.

It will be observed that the billet can have no rotative movement about its longitudinal axis while passing through the rolls, and that no means other than the contour of the roll faces is required in order to hold the bar against rotation. This is another important feature of the invention, because in the rolling of round rods, there is a tendency for the rods to rotate about their longitudinal axes, unless held by some exterior means, and there would be greater tendency for the copper to be unevenly displaced on the core.

It will, of course, be understood that the bars may be shaped or forged by suitable die members other than rolls.

I claim as my invention:—

1. The method of shaping composite bars having a metal sheath and a metal core of different hardness, which comprises forging a bar to form a longitudinally-extending groove therein, having curved walls, and repeating said operation, with the bar turned on its axis from the first position thereof, but maintaining the radius of curvature of said groove approximately constant.

2. The method of shaping composite bars having a metal sheath and a metal core of different hardness, which comprises forging a bar to form a longitudinally-extending grove therein, having curved walls, and repeating said operation, with the bar turned on its axis approximately 90° from the first position thereof, but maintaining the radius of curvature of said groove approximately constant.

3. The method of shaping composite bars having a metal sheath and a relatively hard metal core which comprises shaping a bar to provide a plurality of longitudinally-extending ribs, and forging said bar by pressure applied mainly against the outermost surfaces of the ribs.

4. The method of shaping composite bars having a metal sheath and a relatively hard metal core which comprises shaping a bar to provide a plurality of longitudinally-extending ribs arranged in pairs at diametrically opposite points, forging said bar by pressure applied mainly against the outermost surfaces of two diametrically opposite ribs, and repeating the forging operation against the outer faces of two other diametrically opposite ribs.

5. The method of shaping composite bars having a metal sheath and a relatively hard metal core, which comprises shaping a bar to provide a plurality of longitudinally-extending ribs, forging said bar by pressure applied mainly against the outermost surfaces of the ribs, and holding the bar against rotative movement about its longitudinal axis during said forging operation.

6. The method of shaping composite bars having a metal sheath and a relatively hard metal core, and provided with longitudinally-extending ribs, which comprises initially applying pressure against the outermost surfaces of the ribs to effect flow of sheath metal toward the bases of the ribs, and confining the displaced metal to zones in the vicinity of the said bases.

7. The method of shaping composite bars having a metal sheath and a relatively hard metal core, and provided with longitudinally-extending ribs, the wall thickness of the sheath being thickest on the outermost faces of the ribs, which comprises initially applying pressure against the outermost surfaces of the ribs to effect flow of the sheath metal toward the bases of the ribs, and confining the displaced metal to zones in the vicinity of said bases to produce substantially uniform wall thickness of the sheath.

In testimony whereof I, the said FRANCIS B. NIMICK, have hereunto set my hand.

FRANCIS B. NIMICK.